(12) United States Patent
Nakajima et al.

(10) Patent No.: US 6,724,706 B1
(45) Date of Patent: Apr. 20, 2004

(54) DIGITAL ADAPTIVE EQUALIZER FOR DIFFERENT QUALITY SIGNALS

(75) Inventors: Takeshi Nakajima, Nara (JP); Shinichi Konishi, Nara (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/513,192

(22) Filed: Feb. 25, 2000

(30) Foreign Application Priority Data

Feb. 26, 1999 (JP) .......................................... 11-049998

(51) Int. Cl.⁷ ................................................ H04N 5/76
(52) U.S. Cl. ................................ 369/59.23; 369/59.11; 369/53.15; 369/124.09; 360/65; 375/232
(58) Field of Search ........................ 360/65; 369/59.11, 369/59.23, 53.15, 124.09; 375/232; 714/32

(56) References Cited

U.S. PATENT DOCUMENTS

| | | | | |
|---|---|---|---|---|
| 4,458,362 A | * | 7/1984 | Berkovitz et al. | 381/103 |
| 5,381,357 A | * | 1/1995 | Wedgwood et al. | 708/319 |
| 5,432,818 A | * | 7/1995 | Lou | 375/324 |
| 5,434,883 A | * | 7/1995 | Kimoto et al. | 375/231 |
| 5,537,438 A | * | 7/1996 | Mourot et al. | 375/231 |
| 5,646,957 A | * | 7/1997 | Im et al. | 375/233 |
| 5,712,873 A | * | 1/1998 | Shiue et al. | 375/233 |
| 5,870,372 A | | 2/1999 | Kuribayashi | |
| 5,938,789 A | | 8/1999 | Itoi | |
| 6,055,119 A | * | 4/2000 | Lee | 360/51 |
| 6,055,268 A | * | 4/2000 | Timm et al. | 375/229 |
| 6,064,536 A | * | 5/2000 | Ebisawa et al. | 360/65 |
| 6,134,538 A | * | 10/2000 | Mager et al. | 706/25 |
| 6,418,228 B1 | * | 7/2002 | Terai et al. | 381/71.8 |
| 6,426,946 B1 | * | 7/2002 | Takagi et al. | 370/252 |
| 6,449,349 B1 | * | 9/2002 | Higuchi | 379/100.17 |
| 6,493,165 B1 | * | 12/2002 | Satoh et al. | 360/65 |
| 6,496,316 B1 | * | 12/2002 | Hori et al. | 360/65 |
| 6,519,715 B1 | * | 2/2003 | Takashi et al. | 714/32 |

FOREIGN PATENT DOCUMENTS

| | | |
|---|---|---|
| EP | 805448 | 11/1997 |
| JP | 9-320198 | 12/1997 |

OTHER PUBLICATIONS

"Introduction to Adaptive Filters", *Simon Haykin*, Mac-Millan Publishing Co., @ 1984.

* cited by examiner

*Primary Examiner*—Doris H. To
*Assistant Examiner*—Gautam R. Patel
(74) *Attorney, Agent, or Firm*—Wenderoth, Lind & Ponack, L.L.P.

(57) ABSTRACT

Hold registers receive a hold register enable signal. When reading one kind signal of header field data, the hold register enable signal is High and the registers store newly renewed values of filter coefficients, and when reading a different kind signal of recording field data, the hold register enable signal is Low and the hold registers hold the last stored header field contents of the registers. Then, when a header field of a next sector is detected, the contents held in the hold registers are taken and preset to the registers. Thus, even in a case where an intermittent reproduction signal having different kinds of formats is processed in playback, the continuous adaptive equalization can be realized over the different kinds of reproduction signals in quality.

6 Claims, 14 Drawing Sheets

LMS COEF. CALCULATION BLOCK

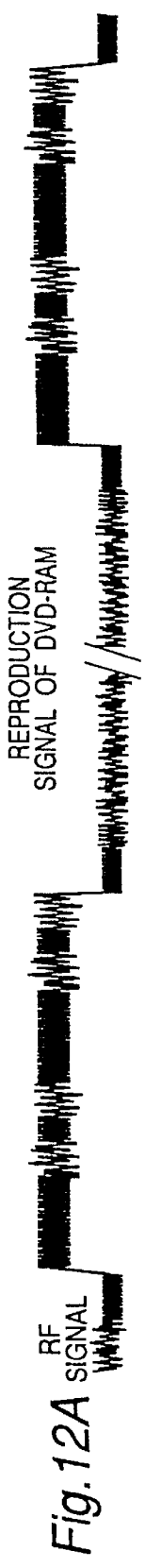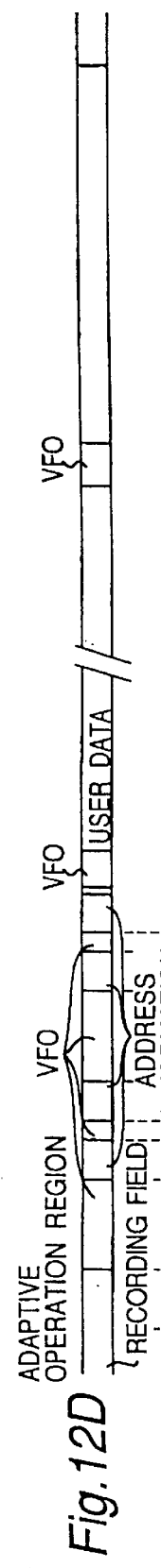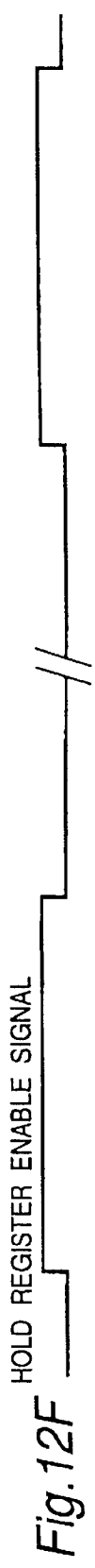

DIGITAL ADAPTIVE EQUALIZER FOR DIFFERENT QUALITY SIGNALS

BACKGROUND OF THE INVENTION

1. Field of the Invention

The present invention generally relates to an information reproducing apparatus in a disk playback system, and in particular to an adaptive equalizer for use in a digital data reproducing apparatus reproducing information which was continuously recorded on a disk medium along a data recording guide groove having a periodically wobbling sector format formed on the disk medium. The adaptive equalizer adaptively equalizes each of transmission signals having different signal formats in quality and multiplexed in time basis.

2. Description of the Prior Art

Recently, there has been increasing utilization of various magnetic or optical disks such as CD or DVD having a sector format formed with a recording guide groove periodically wobbling. When information is read out of such a disk, the read-out data signal is supplied to a PLL circuit which generates a clock synchronized with the read-out signal to reproduce digital data synchronized with the clock signal.

In a structure of a sector format formed on a disk, a guide track formed in, e.g., a RAM portion on the disk includes a groove portion and a land portion. The guide track is formed in such a manner that a laser beam spot projected from an optical pick-up head tracks a specified position when information is recorded on the disk. The groove portions and land portions are continuously alternated every one rotation of the disk where the information can be recorded both on the groove and land portions. The guide track is divided into a plurality of sectors and each of the sectors is comprised of an ID region and information recording region. In this example, although the guide track is formed in a spiral format, it may be of a concentric circle format, and also it may be reversible in spiral direction.

In the case where the original data recorded on, for example, an optical disk medium, is reproduced by means of a pickup head, if an optical axis of an object lens of the pickup head is not perpendicular to a surface of the disk but inclined at some angle with respect to the surface of the disk, there may undesirably by generated a warp distortion in a waveform of the reproduced signal output of the optical head. As a method of removing the distortion components included in the reproduction signal waveform, there has been conventionally used an adaptive equalizer utilizing a finite impulse response (referred to as "FIR", hereinafter) filter.

Specifically, an adaptive equalization is recently carried out in a digital data processing system by previously quantizing the reproduced signal using an A/D converter. Examples of such an adaptive equalizer are disclosed in, e.g., U.S. Pat. No. 5,938,789, U.S. Pat. No. 5,870,372, European Patent Application EP 805448 A2 and Japanese Patent Laid Open Publication 9-320198, where the European Patent Application EP 805448 A2 discloses an adaptive equalizer filter that operates according to a well known least mean square (LMS) algorithm. The LMS algorithm for adaptive equalization is also disclosed in a document "Introduction to Adaptive Filters" by Simon Haykin, published in 1984.

According to the least mean square (LMS) algorithm, the FIR filter coefficient vector of the adaptive equalizer is recursively renewed based on Equation (1) as below:

$$h(n+1) = h(n) + \mu \cdot e(n) \cdot u(n) \quad (1)$$

where $h(n)$ represents a vector of filter coefficients before equalization; $h(n+1)$ represents a vector of filter coefficients after equalization; $\mu$ is a programmable gain; $e(n)$ represents a sample error between the filter's actual output and a desired output; and $u(n)$ represents a vector of sample values input to the FIR filter. By this arrangement, the filter coefficients (i.e., frequency and phase response of the filter) are adapted until a minimum sample error is achieved.

Particularly in recent years, the data recording density on the recording medium has been remarkably increased and distortion of the reproduction signal due to inter-code interference of the recorded data on the medium has increased, and also a noise influence in a data transmission path cannot be ignored because of a reduction in amplitude of the reproduction signal. In order to improve the signal reading efficiency with a reduction of a bit error rate of recorded or playback codes, a playback data detecting method has been employed to detect an optimal playback data by operating a partial response (referred to as "PR", hereinafter) equalization of an automatic adaptive equalizer in combination with a Viterbi decoding unit, whereby data stream of transmission signals is monitored before and after a specified time point so as to select the most likely data pattern closest to a desired data pattern from among the monitored data patterns to thereby obtain the optimal coefficients of the FIR filter.

FIG. 13 shows a conventional example of a general read channel for generating binary output data from a reproduction signal. In this construction, the read channel includes an automatic gain controller (referred to as "AGC", hereinafter) 1 for adjusting an amplitude of the reproduction signal to have a constant amplitude, an analog filter 2 for removing noise components of high frequency band and emphasizing necessary frequency band components of the signal, and an A/D converter 3 for sampling the reproduction signal.

The read channel further includes a digital equalizing filter 4 for adaptively equalizing the discrete sampled data to execute a predetermined PR equalization, and a Viterbi decoder 5 for generating maximum likelihood binary data from the discrete sampled data of the reproduction signal. Furthermore, a D/A converter 6 and a voltage control oscillator (referred to as "VCO", hereinafter) 7 for synchronization are provided in a feedback loop of the A/D converter 3. By applying the adaptive equalization method to the digital equalizing filter 4, the filter coefficients are recursively renewed in accordance with a waveform distortion included in the reproduction signal to thereby realize a predetermined PR equalization. In particular, when data is reproduced from a disk medium such as CDROM, DVD-ROM which was continuously recorded with data signals over the entire circumference of the medium, the adaptive equalizer is continuously operated during all the operation time to recursively renew the filter coefficients. Thus, variation in distortion of the reproduction signal is compensated to thereby enhance reliability of the original digital reproduction data.

However, in a general data recordable disk medium such as CD-RAM, DVD-RAM, a sector format is formed in such a manner that data is recorded in sector units and each sector having a specified length is provided with a string of physical emboss pits for managing user data. In a conventional sector format, an emboss pits string including address information was reduced in recording density to have adequate redundancy so that the address information has higher reliability than the user data. However, in recent years, in order to increase a formatting efficiency, there has been put to practical use a sector format such that the emboss pits for recording address information have a recording density as high as that for the user data. For example, a sector format of DVD-RAM is comprised of an emboss pits string called a header field, a mirror field and a user data recording field having a data length of 2048 bytes.

FIG. 14 shows an example of a header field layout having a segment far shorter in data length than that of the data recording field. In this construction, the header field is comprised of two pairs of header field regions, the two pairs being shifted toward an inner or outer peripheral side by a distance of ½ track pitch. The width of the pit signal corresponding to the header region is made generally equal to the width of a groove portion or land portion in the user data recording field.

As shown in FIG. 14, the groove portion and land portion are periodically wobbling in a zigzag or sine wave format in a direction perpendicular to the tracing direction of the track. This sine wave wobble indicates that, when data is recorded on the user data recording region in the RAM portion by operating a disk drive, the period of the wobble is detected to generate a clock signal in synchronization with the detected period so that the data is recorded in synchronization with the clock signal. The wobble appears generally all around the groove and land portions. The laser beams always scan along the center line portion of the track in the data recording field. On the other hand, the laser beams scan the emboss pits region of the header fields in an off-track condition, and the resultant reproduced signal is intermittent in this sector format type disk. Accordingly, if a continuous adaptive equalization is carried out on the intermittent reproduction signal over the header fields, the resultant equalization is erroneous, and a desired PR equalization cannot be obtained, which deteriorates the reliability of the reproduction data.

Moreover, because the laser beams scan the emboss pits region of the header fields in an off-track condition due to the zigzag or sine wave wobble, the distortion components included in the reproduction signal are different between the header field and the user data recording field. Therefore, the optimal equalization cannot be executed for each of the fields by the continuous equalization and the reliability of the detected address information is deteriorated to be a problem.

Moreover, because the header field is much shorter in physical data length than the recording field, there is not secured an adequate time for learning an adaptive equalization within one header field, and therefore this may deteriorates the reliability of the detected address information.

SUMMARY OF THE INVENTION

The present invention has been developed to solve these problems and has an object to provide an adaptive equalizer for a data reproducing apparatus, improving an adaptive equalization to each of a plurality of reproduction signals having different distortion components, and in particular, improving an adaptive equalization to a header field including address information and obtaining optimal filter coefficients to thereby realize a PR equalization with high reliability.

Another object of the present invention is to provide a data reproducing apparatus processing different kinds of reproduction signals including the improvement of the adaptive equalizer.

In order to achieve the objects mentioned above, a first aspect of the present invention provides an adaptive equalizer adaptively equalizing first and second signals having different signal qualities multiplexed in time basis. The adaptive equalizer comprises: a learning portion for adaptively equalizing each of the multiplexed first and second signals according to a signal format of the subject signal; and a holding portion for temporarily holding the learned results of at least one of the first and second signals learned by the learning portion, wherein the learning portion is operated for adaptive equalization using the last learned results temporarily held in the holding portion, and wherein the equalization operation duration is determined in accordance with a formatted data length of each of the subject signals.

In this an arrangement, the temporary holding duration of the learned results of one of the signals substantially corresponds to the equalization duration of the other signal. The adaptive equalization operation is executed using control signals which are generated by a control signal generating portion for controlling the learning portion and holding portion in a manner such that, when a signal of the same kind is inputted to the learning portion in the subsequent operation, the holding portion presets the last held results of the same signal to the learning portion so that the learning portion recursively executes the learning operation based on the last learned results of the same signal.

A second aspect of the present invention provides a digital adaptive equalizer for adaptively equalizing discrete sampled data of the different quality signals, which comprises: a digital filter portion for equalizing the sampled data of each of the signals; and a coefficient calculating portion for recursively renewing coefficients of the digital filter portion based on the output data of the digital filter portion, wherein the coefficient calculating portion includes the holding portion for temporarily holding the renewed coefficients as the learned results.

A third aspect of the present invention provides a data reproducing apparatus reproducing first and second different kinds of signals from a data recording medium to process the reproduced signals having different signal qualities and multiplexed in time basis. The data reproducing apparatus comprises a signal processing portion for digitally processing the reproduced signals to obtain binary data of the reproduced signals, wherein the signal processing portion includes an adaptive equalizer as defined in the first aspect.

A fourth aspect of the present invention provides a digital data reproducing apparatus reproducing original digital data from a data recording medium having an intermittent data format. The digital data reproducing apparatus comprises: an A/D converter for converting reproduction data read out of the recording medium into digital form to obtain discrete sampled data; an adaptive equalizer for adaptively equalizing the discrete sampled data output of the A/D converter to execute a predetermined partial response (PR) equalization; a Viterbi decoder for generating a maximum likelihood binary data from the equalization results output of the adaptive equalizer in accordance with a theory of a transition state defined by a recorded code; and a controller for controlling the adaptive equalizer based on the binary data output of the Viterbi decoder, wherein the adaptive equalizer includes a holding portion for temporarily holding the equalized results.

By this arrangement, according to the present invention, even in the case where the transmission signals multiplexed in time basis having different signal quality are equalized, the optimal filter coefficients are calculated to be stored and held for adaptively equalizing each of the different signals, the continuous adaptive equalization can be realized over the different kinds of signals in quality.

Moreover, in the digital information reproducing apparatus according to the present invention, various control signals are fed from the controller to the adaptive equalizer, and the continuous adaptive equalization can be realized over the header field and the data recording field.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIGS. 12A, 12B, 12C, 12D, 12E, 12F, 12G, and 12H are timing charts for explaining an operation of the present embodiment;

DETAILED DESCRIPTION OF THE PREFERRED EMBODIMENTS

Figure 1:
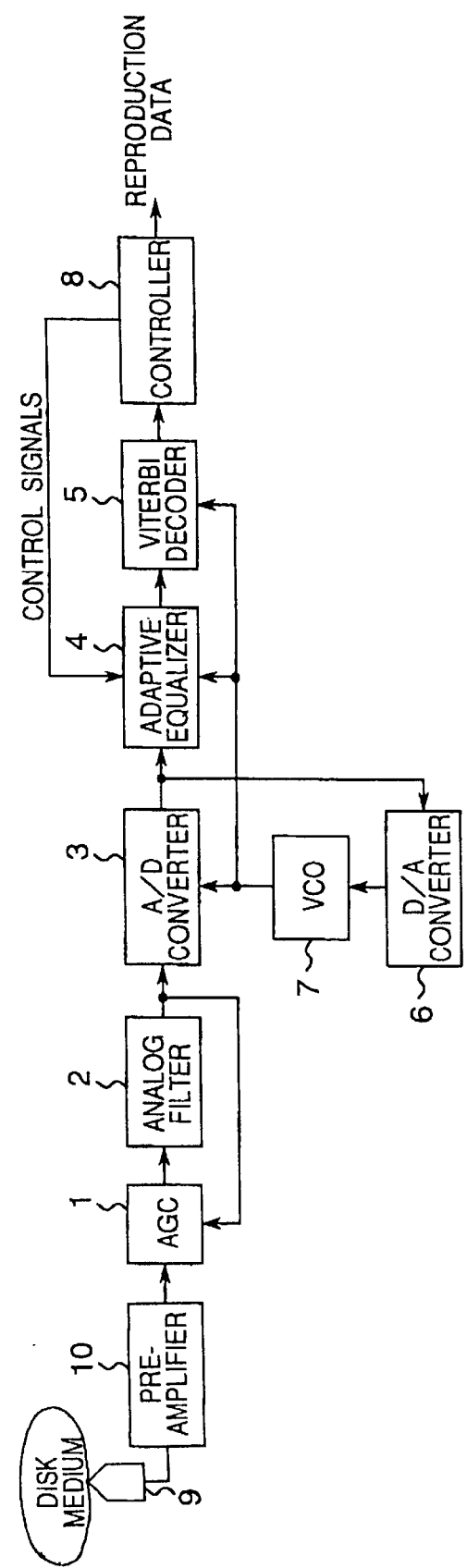
FIG. 1 is a block diagram of a data reproducing apparatus of an embodiment according to the present invention.

Before the description proceeds, it is to be noted that, since the basic structures of the preferred embodiments are in common to the conventional one, like parts are designated by the same reference numerals throughout the accompanying drawings.

A first preferred embodiment of a data reproducing apparatus for use in a disk player will be described below with reference to accompanying drawings. In the description, it is to be noted that, although the description is referred to only as a data reproducing apparatus using an optical disk having a sector format including a periodically wobbling recording groove, the present invention is also applicable to data reproduction using such as CD disk, DVD-ROM disk and the like having continuously recorded data thereon. In the description, it is noted here that a read channel for generating original digital reproduction information includes an adaptive equalizer in combination with a Viterbi decoder for generating a maximum likelihood binary data, utilizing a theory of a transition state composed of 6-states with 5-values using at least 3 bits of the minimum polarity inversion interval while the transmission characteristics are defined as a PR (a, b, b, a) equalization where a, b are actual numbers except 0.

Figure 14:
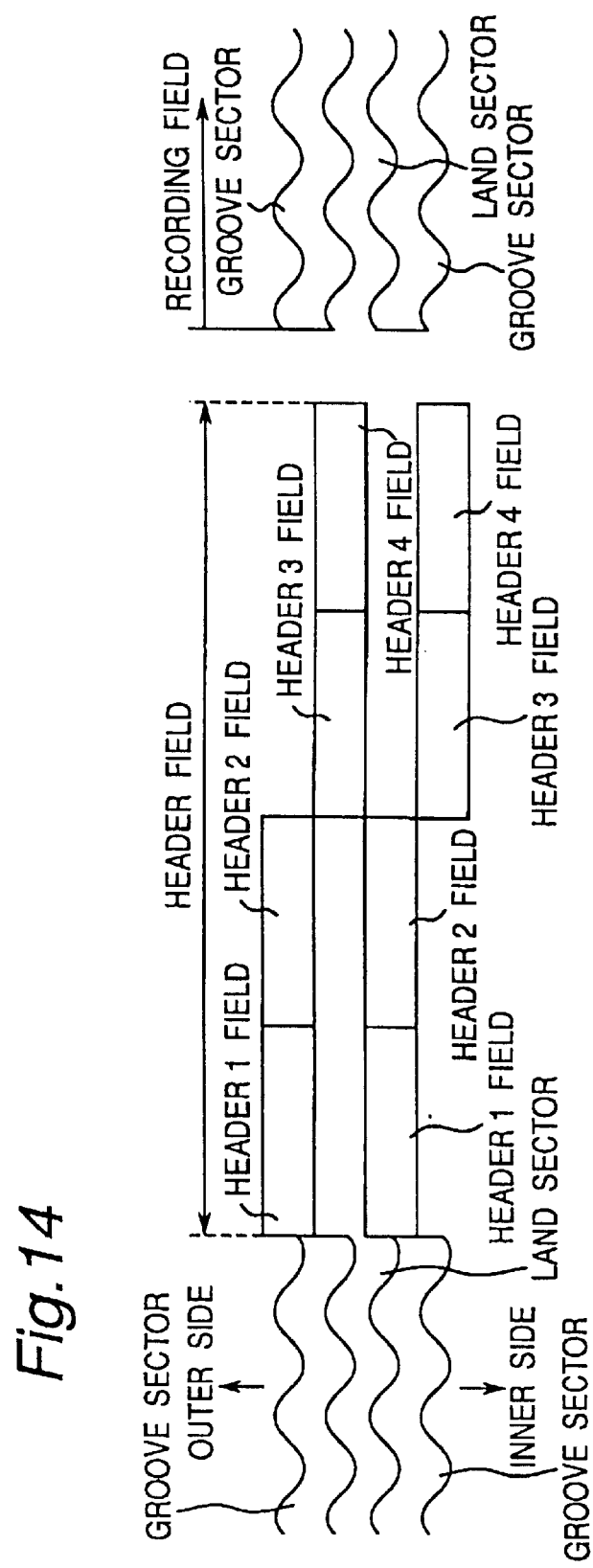
FIG. 14 is an explanatory view showing a schematic construction of a sector format of a disk medium.

FIG. 1 shows a block construction of a sampled amplitude read channel according to an embodiment of the present invention which reads a reproduction signal from a disk medium and generates binary data therefrom, including an adaptive equalizer in a digital data reproducing apparatus. In this construction, an optical disk is used as an example of a disk medium which has a sector format of a periodically wobbling recording groove as shown in FIG. 14. An optical pick-up head 9 applies laser beams to the optical disk and reads the recorded data based on the quantity of the reflected light beams and generates an electric signal therefrom. A preamplifier 10 amplifies the output signal of the pick-up head and generates a RF signal.

The read channel includes an auto-gain controller (AGC) 1 for adjusting an amplitude of the reproduction signal to have a constant amplitude, an analog filter 2 for removing noise components of high frequency band and emphasizing a necessary frequency band components of the reproduction signal, and an A/D converter 3 for sampling the reproduction signal with a channel clock signal to constitute a digital read channel. The sampling clock of the A/D converter is controlled in accordance with variable frequency oscillation (VFO) regions formed in the sector format (see FIG. 12D).

The read channel further includes a digital adaptive equalizer 4 for adaptively equalizing the discrete sampled data output of the A/D converter 3 to execute a predetermined PR equalization, and a Viterbi decoder 5 for generating a maximum likelihood binary data from the equalization results of the discrete sampled data of the reproduction signal. The read channel further includes a disk controller 8 which, based on the binary outputs data of the Viterbi decoder 5, generates various control signals to be applied to the adaptive equalizer 4 for signal equalization processing. Furthermore, a D/A converter 6 and a voltage control oscillator (VCO) 7 for synchronization are provided in a feedback loop of the A/D converter 3. Thus, the filter coefficients of the adaptive equalizer are recursively renewed in accordance with a waveform distortion included in the reproduction signal to thereby realize a predetermined PR equalization. In this construction, a discrete equalizer filter may be implemented as a real-time adaptive filter which compensates for parameter variations over the disk radius (i.e., zones), disk angle, and environmental conditions such as temperature drift.

Figure 2:
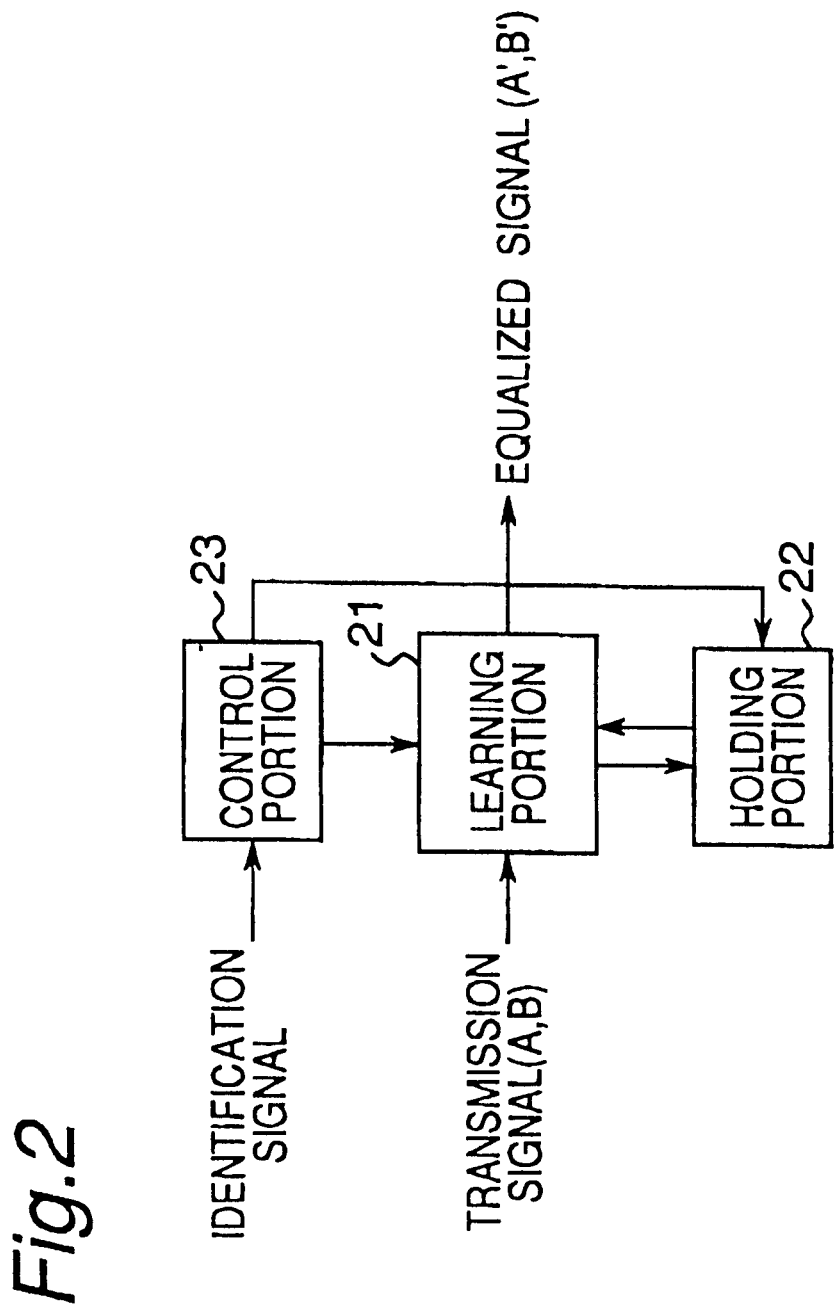
FIG. 2 is a conceptual block diagram explaining an essential construction of an adaptive equalizer according to the present embodiment.

FIG. 2 shows an essential concept of an adaptive equalizer according to the present invention. In this example, the adaptive equalizer adaptively equalizes, e.g., two transmission signals A and B having different signal qualities which were multiplexed in time basis. As shown in FIG. 2, the adaptive equalizer is comprised of a learning portion 21 for adaptively equalizing the multiplexed transmission signals A and B, a holding portion 22 for temporarily holding the learned results of the transmission signals A and B obtained by the learning portion 21, and a control portion 23 for controlling the learning portion 21 and holding portion 22. That is, under the control of the control portion 23, the learning portion 21 is operated only in a time period which is determined in accordance with the data length format of the subject signal while the learned results are temporarily held in the holding portion 22.

When the control portion 23 receives an identification signal identifying whether the input signal applied to the adaptive equalizer is the signal A or signal B of the two different transmission signals, the control portion 23 controls the learning portion 21 to learn the signal pattern of the input signal for an adaptive equalization processing thereof. Subsequently, the learning portion 21 adaptively equalizes the transmission signals A and B individually every applications thereof using the learned results and generates the adaptively equalized resultant signals A' and B' as the outputs of the equalizer.

The holding portion 22 temporarily holds the learned results of the signal A (or B) when the signal A (or B) is applied. When the signal A of the same kind is inputted to the learning portion 21 in the subsequent operation of processing the next sector, the holding portion presets the last stored results of the signal A to the learning portion so that the learning portion recursively executes the learning operation based on the stored learning results of the signal A. As to the other signal B of the different kind, the holding and learning operation may be performed in a similar manner to the signal A. Alternatively, in a preferred embodiment, only one of the signals A and B is held in the holding portion 22.

In this operation, the reproduction RF signal includes remarkably different amplitude portions between the different signal quality regions. Accordingly, the different signal quality regions are surely identified to thereby produce the identification signal. Once the identification signal is initially generated, in the subsequent reproduction operation, the identification of the different signal quality regions can be carried out according to the sector format of the disk medium, which is described later with reference to FIG. 12A.

In this embodiment, the learning portion 21 and holding portion 22 may be included in the adaptive equalizer block 4 and the control portion 23 may be included in the controller 8 shown in FIG. 1.

Figure 3:
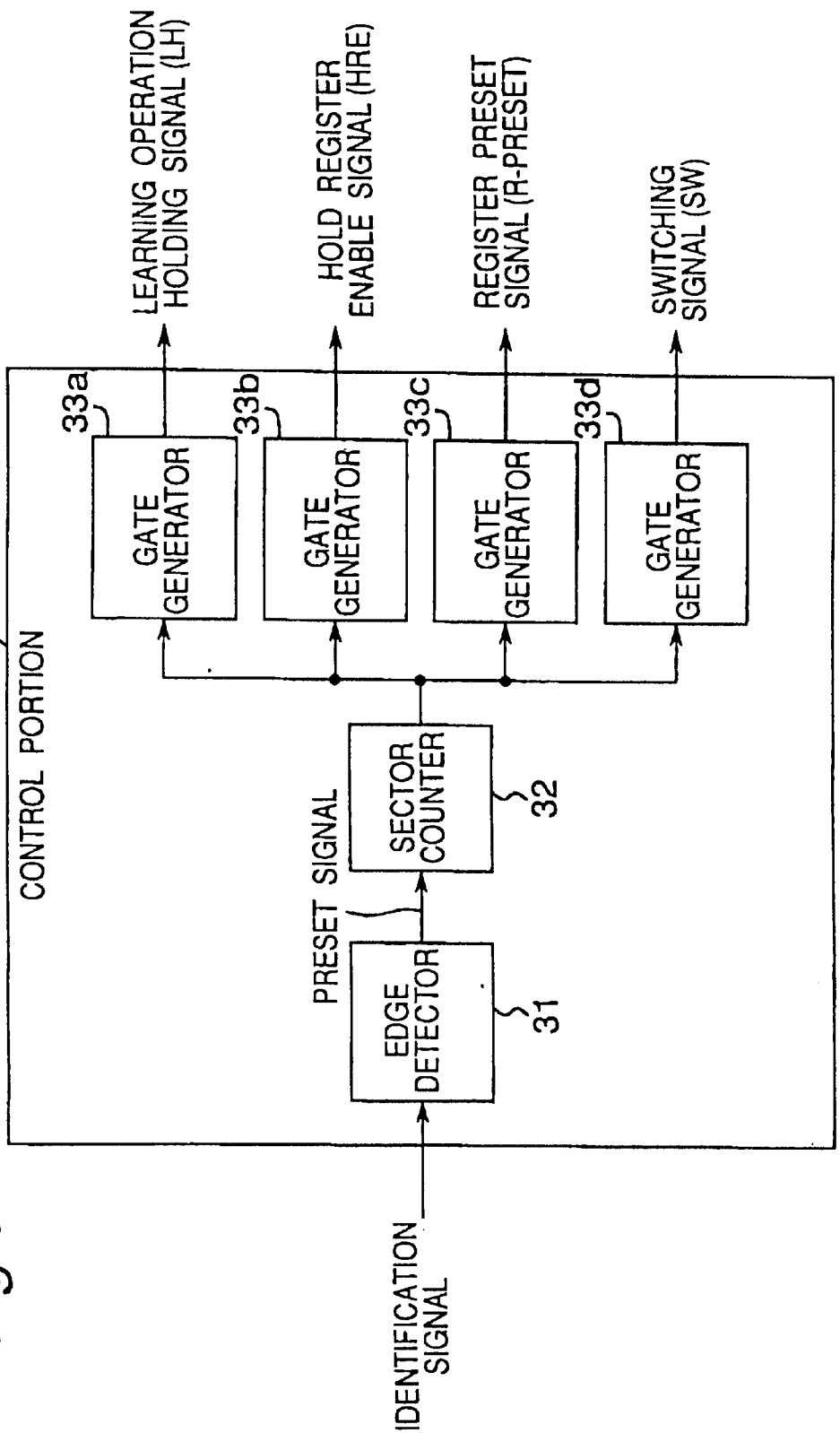
FIG. 3 is a block diagram showing a construction of a controller of an adaptive equalizer according to the present embodiment.

FIG. 3 shows a construction example of the control portion 23 shown in FIG. 2, which includes an edge detection unit 31 for detecting an edge of a transmission signal upon receipt of the identification signal to generate a preset signal, a sector counter unit 32 for counting the formatted data length of the transmission signal, and gate generator units 33a to 33d for generating various control signals such as a learning operation holding signal (LH), a hold register enable signal (HRE), a register preset signal (R-PRESET), and a switching signal (SW). The control signals are described later with reference to FIGS. 12E to 12H. Thus, the control portion 23 serves as a control signal generating means.

By this arrangement, upon receipt of the preset signal output of the edge detection unit 31, the counter unit 32 is preset at the head leading edge of the applied signal A (or B) and the formatted data length of the signal A (or B) is counted by the counter unit 32 with a reproduction clock signal. Upon receipt of the counted values output of the counter unit 32, the gate generator units 33a to 33d decode predetermined values to generate the various control signals based on the counted values. The gate generator units 33a to 33d generates the learning operation holding signal LH, hold register enable signal HRE, register preset signal R-PRESET, and switching signal SW, respectively. These control signals are appropriately applied to the learning portion 21 and holding portion 22 of the adaptive equalizer 4.

Figure 4:
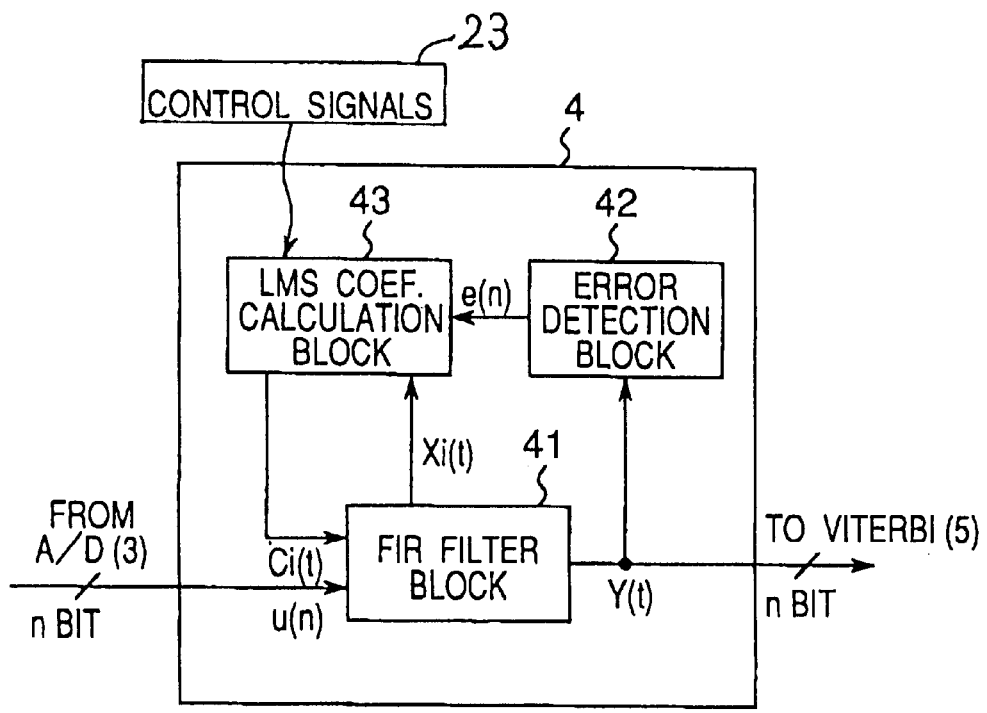
FIG. 4 is a block diagram showing an essential construction of an adaptive equalizer of the present embodiment.

FIG. 4 shows a construction example of the adaptive equalizer 4 shown in FIG. 1, which includes a FIR filter block 41, an error detection block 42 and a LMS coefficient calculation block 43. The LMS coefficient calculation block 43 recursively renews the coefficients of the FIR filter block 41 in accordance with Equation (1) to obtain the predetermined PR (a, b, b, a) equalization.

Figure 5:
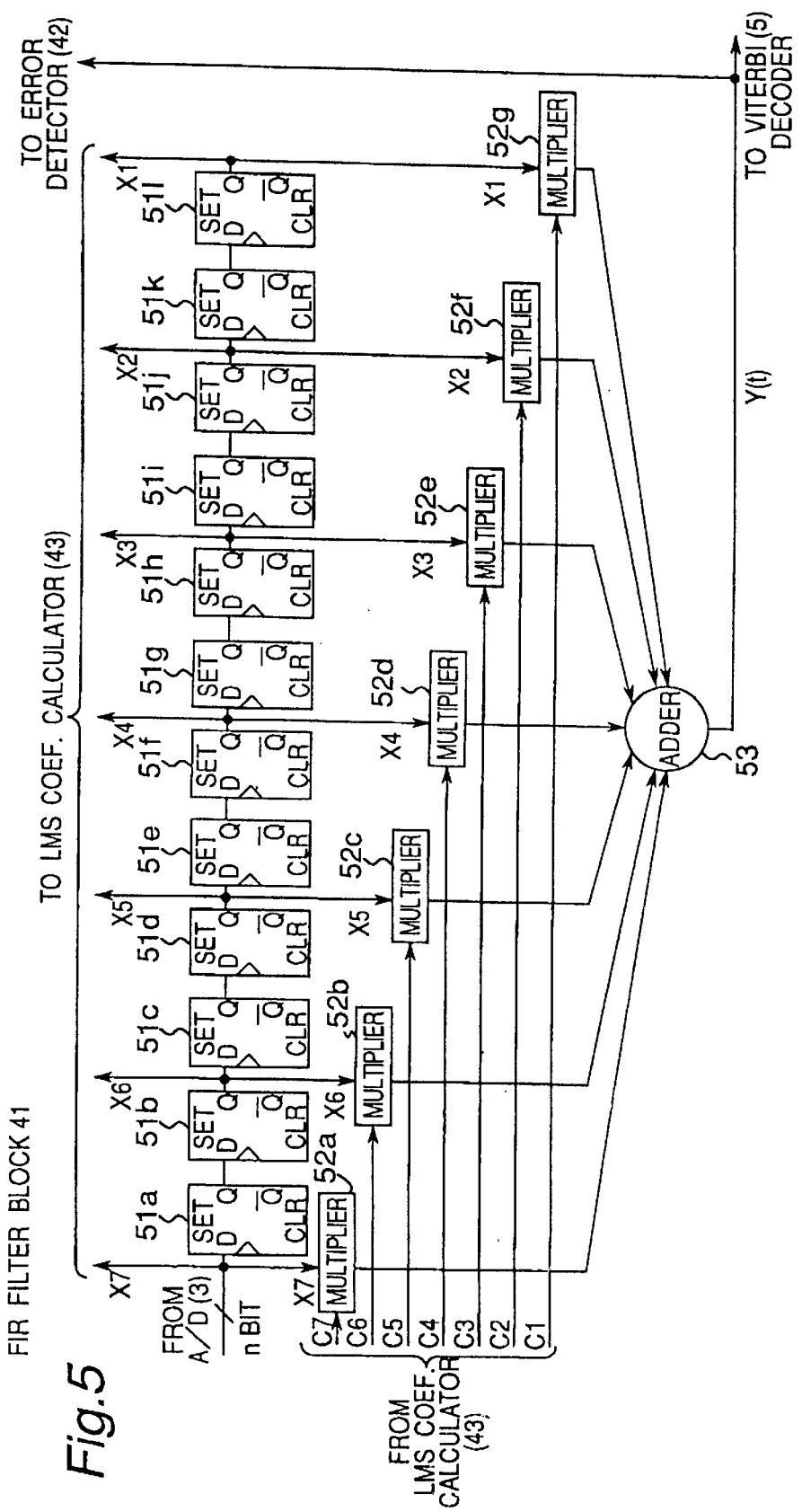
FIG. 5 is a block diagram showing a construction of a FIR filter.

The following describes the construction of each block 41, 42 and 43 of the adaptive equalizer 4. FIG. 5 shows a construction example of the FIR filter block 41 which receives the digital sampled data of the reproduction signal output from the A/D converter 3. The FIR filter block 41 includes delay units 51a to 51l for delaying the input sampled data in turn for every reproduction clocks, multipliers 52a to 52g for multiplying coefficients Ci(t) applied from the LMS coefficient calculation block 43 by the delayed values Xi(t) output by the delay units 51a to 51l, and further includes an adder 53 for obtaining a total sum $Y(t)=\Sigma c_i(t) \times X_i(t)$, where i indicates an integer from 1 to 7 and t indicates a present time. By this arrangement, the delayed values Xi(t) output by the delay units 51a to 51l are also fed to the LMS coefficient calculation block 43 while the total sum Y(t) output of the adder 53 is fed to the error detection block 42 and is also generated as the equalization result to be applied to the Viterbi decoder 5.

Figure 6:
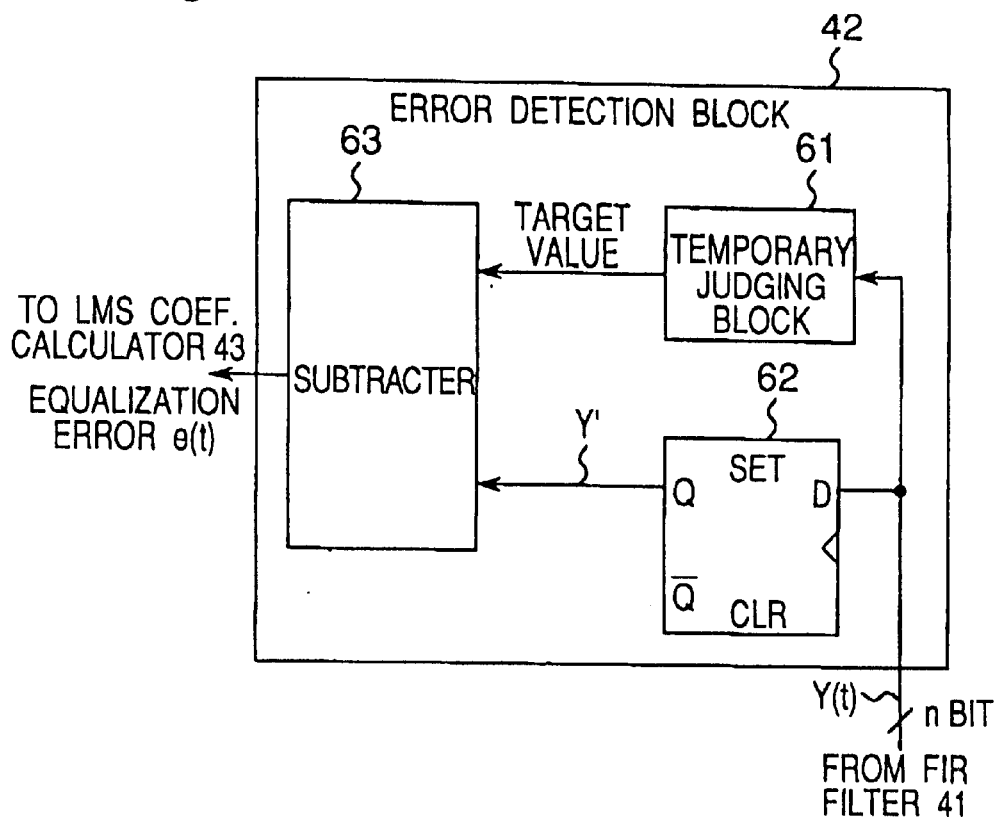
FIG. 6 is a block diagram showing a construction of an error detection unit.
Figure 7:
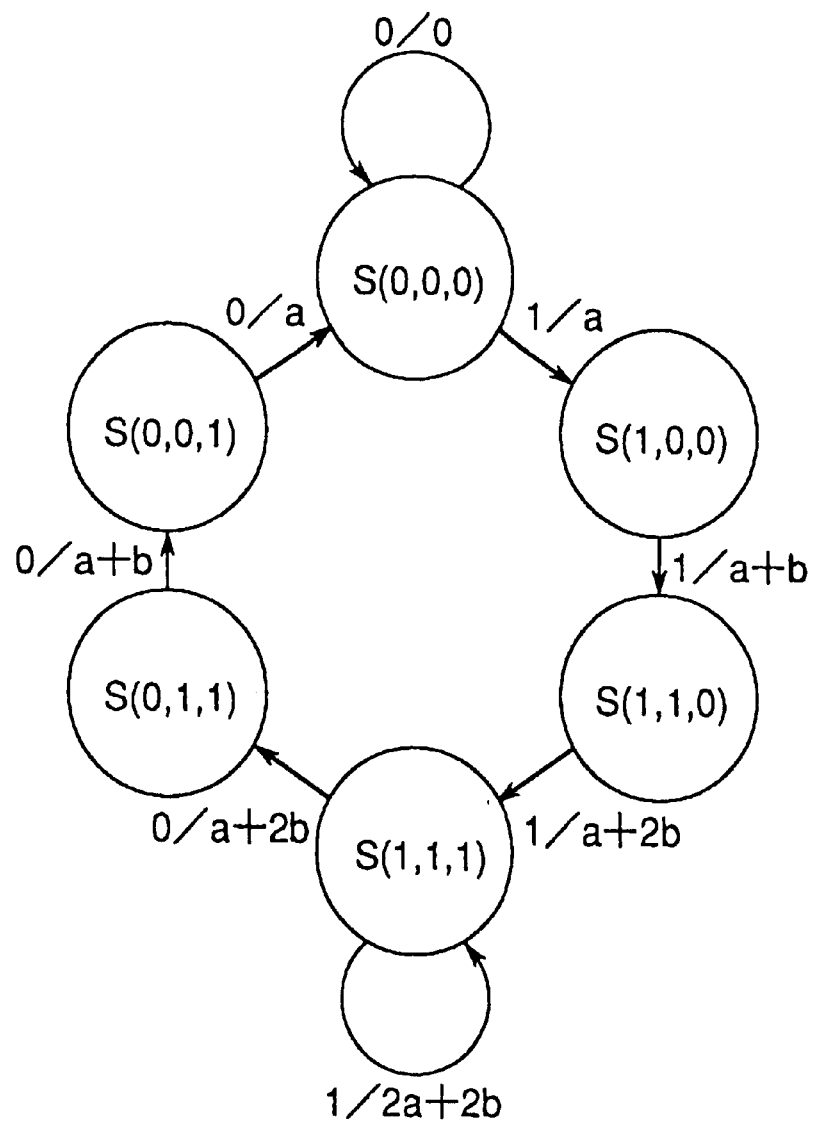
FIG. 7 is an explanatory view showing a state transition of a state machine of 6-states with 5-values.

FIG. 6 shows a construction of the error detection block 42 which includes a temporary judging block 61, a delay unit 62 and a subtracter 63. In the case where the characteristic of the transmission path is defined as an ideal PR (a, b, b, a) equalization utilizing a theory of a transition state composed of 6-states with 5-values using a recorded code of the minimum polarity inversion interval of at least 3 bits, the equalization result Y(t) applied from the FIR filter block 41 takes five values of $2a+2b$, $a+2b$, $a+b$, $a$, and $0$, as represented by the state transition of the state machine of 6-states with 5-values shown in FIG. 7. However, in the actual transmission path, there may be caused an error due to variation of the transmission characteristic and superposition of noises in the transmission path. This is because the temporarily judging block 61 judges which of the five values of $2a+2b$, $a+2b$, $a+b$, $a$, and $0$ is taken as the ideal equalization result Y(t) output of the FIR filter block 41.

Figure 8:
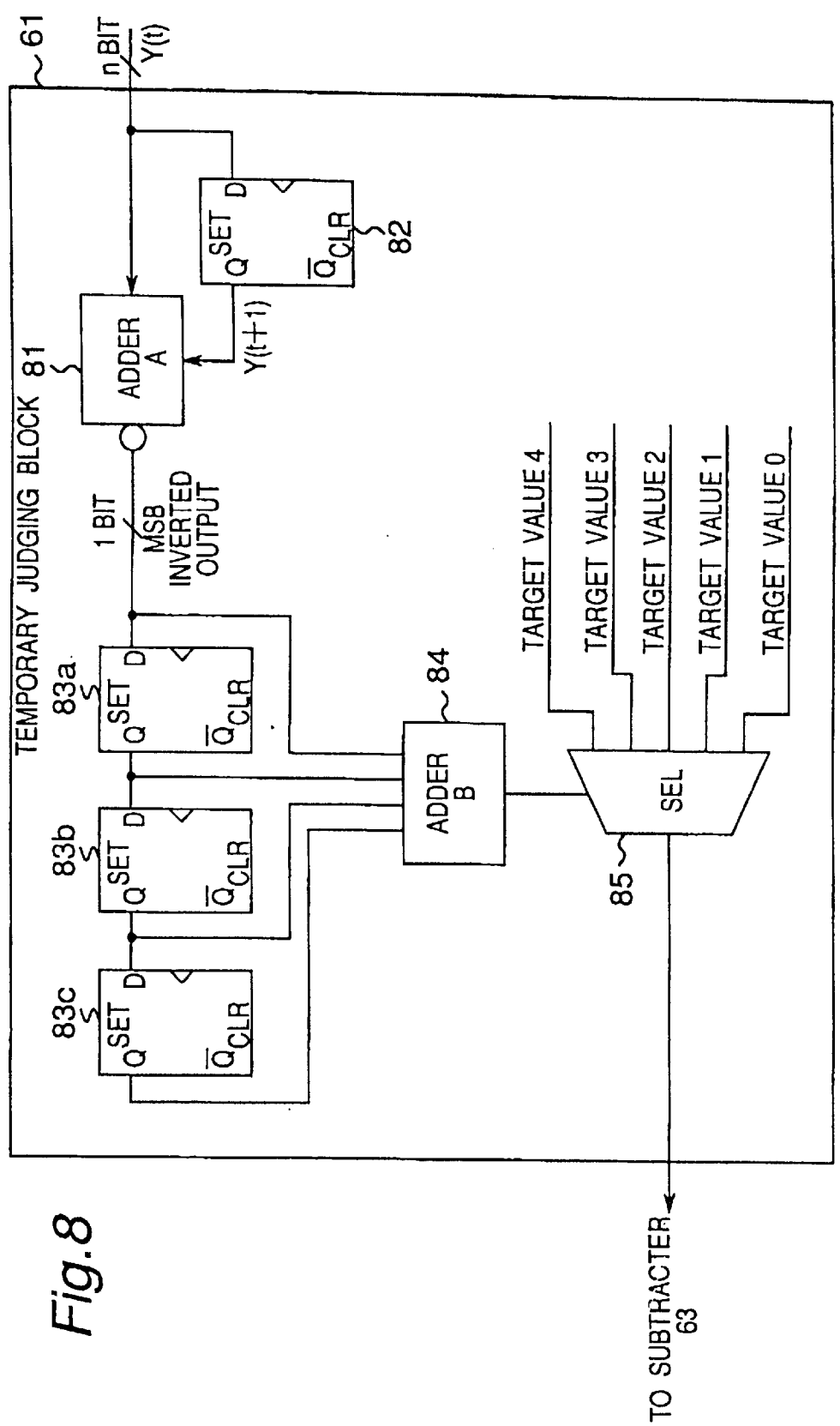
FIG. 8 is a block diagram showing a construction of a temporarily judging unit.

FIG. 8 shows a construction of the temporary judging block 61. In the case where the equalization result Y(t) output of the FIR filter block 41 is represented as a two's complement, the output Y(t) of the FIR filter block 41 and the delayed value T(t+1) thereof delayed by one clock by a delay unit 82 are added together by an adder A 81. The inverted output value of the most significant bit (MSB) of the adder A 81 is inputted to delay units 83a, 83b and 83c in turn with a delay. The total 4 bits of the input and output of the delay units 83a, 83b and 83c are added together by an adder B 84 to obtain five values of 0, 1, 2, 3, and 4. The output values of the adder B 84 are fed to a selector SEL 85, and the selector 85 selectively generates an equalization target value in accordance with the output values of the adder B 84, which the obtained equalization target value is fed to a subtracter 63. When the output value of the adder B 84 is 4, the selector 85 generates an equalization target value corresponding to $2a+2b$. When the output value of the adder B 84 is 3, the selector 85 generates an equalization target value corresponding to $a+2b$, when the output value of the adder B 84 is 2, the selector 85 generates an equalization target value corresponding to $a+b$, when the output value of the adder B 84 is 1, the selector 85 generates an equalization target value corresponding to $a$, and when the output value of the adder B 84 is 0, the selector 85 generates an equalization target value corresponding to 0.

Thus, a difference between the equalization target value output of the temporarily judging block 61 and the delayed equalization value Y' delayed by the delay unit 62 by a predetermined time is calculated by a subtracter 63, and the calculated difference is generated as an equalization error e(t) output of the error detection block 42, which the output equalization error e(t) is applied to the LMS coefficient calculation block 43.

Figure 9:
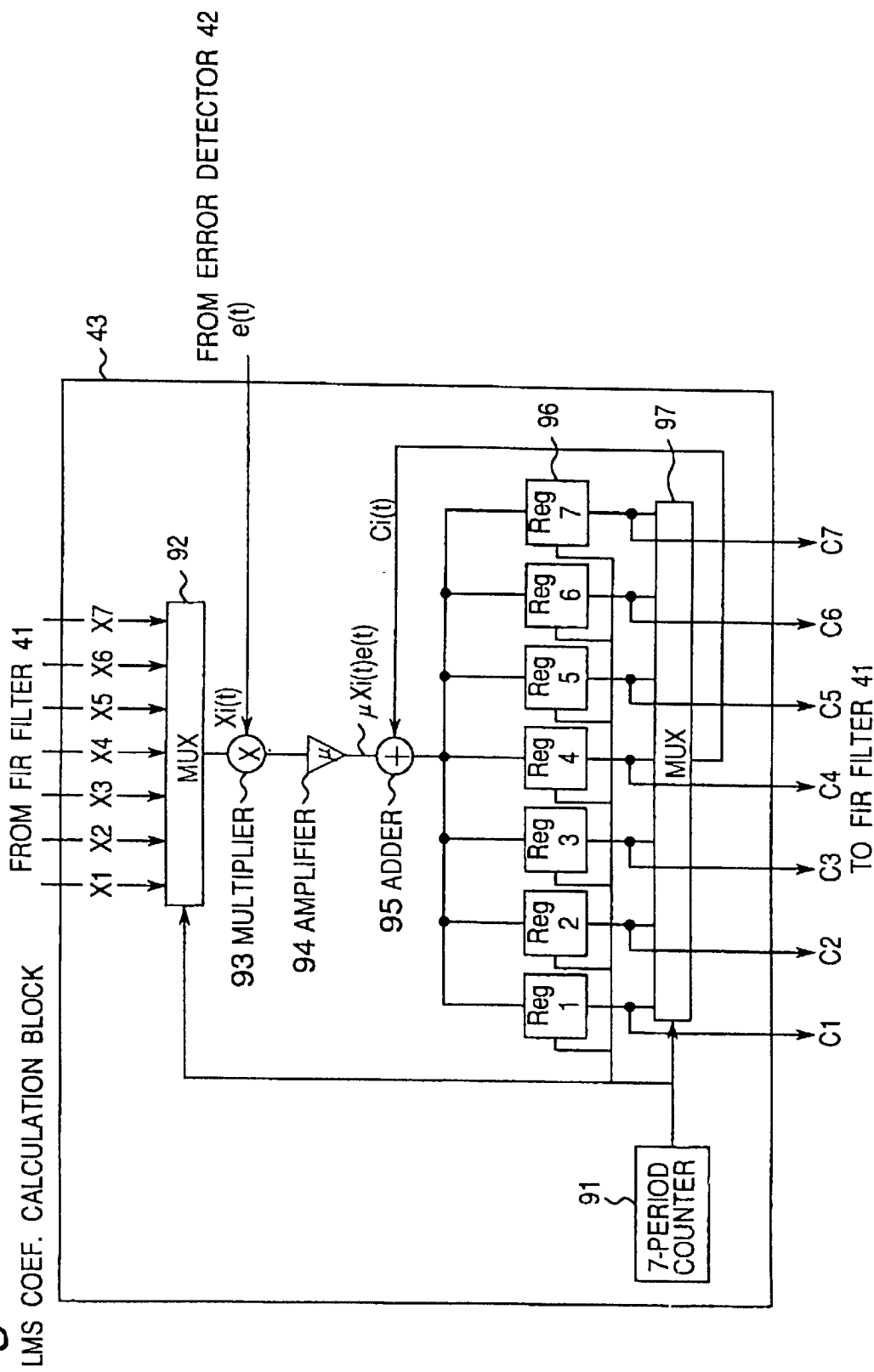
FIG. 9 is a block diagram showing an essential construction of a LMS coefficient calculation unit.

The following describes a fundamental construction of the LMS coefficient calculation block 43 with reference to FIG. 9. The LMS coefficient block 43 renews one coefficient of the FIR filter 41 per one clock, that is, a thinned-out operation is executed corresponding to the number of filter coefficients (i.e., 7 in this example). The LMS coefficient calculation block 43 includes a first multiplexer 92 which is activated to select one of the delayed values Xi(t) output by the delay units (51) of the FIR filter block 41 in a thinned-out operation manner based on an output of a 7-period counter 91. Each of the selected delayed values Xi(t) output by the delay units (51) is multiplied by the equalization error e(t) applied from the error detection block 42 by means of a multiplier 93 to obtain a product Xi(t)e(t). The product output of the multiplier 93 is amplified by an amplifier 94 having a gain $\mu$ and the amplified product $\mu$Xi(t)e(t) is fed to an adder 95 by which the amplified product $\mu$Xi(t)e(t) is added to each of the pre-renewal filter coefficients Ci(t).

The LMS coefficient calculation block 43 further includes registers REG1 to REG 7 (represented by reference numeral 96) which store the resultant output $\mu$Xi(t)e(t)+Ci(t) of the adder 95 as a newly renewed value of each filter coefficient based on the signal format length counted by the 7-period counter 91, and further includes a second multiplexer 97 which selects each of the registers REG1 to REG 7 based on the counted value of the 7-period counter 91. Thus, the newly renewed filter coefficients C1 to C7 are generated by the registers 96 as the outputs of the LMS coefficient calculation block 43 and fed back to the FIR filter block 41.

Figure 10:
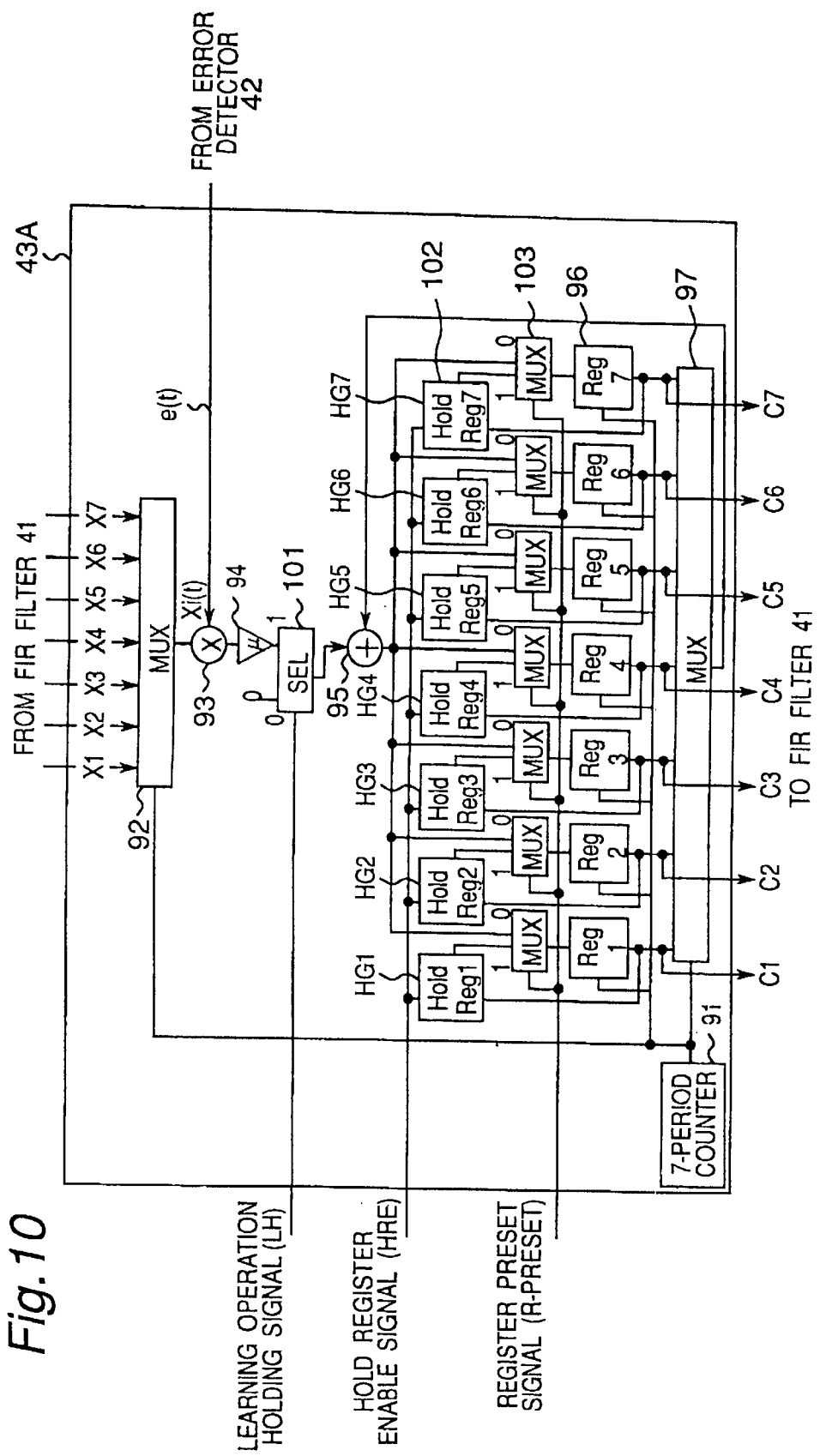
FIG. 10 is a block diagram showing a construction of a LMS coefficient calculation unit according to a first embodiment of the present invention.

FIG. 10 shows a construction 43A of a LMS coefficient calculation block of an adaptive equalizer according to a first preferred embodiment of the present invention. In this construction 43A, the specific feature distinct from the construction 43 shown in FIG. 9 resides in the fact that a selector 101, a group of hold registers HG1 to HG7 (represented by reference numeral 102) and a group of multiplexers (represented by reference numeral 103) are additionally provided in the LNS coefficient calculation block. The selector 101 receives the learning hold signal LH (see FIG. 12E) from the controller 8, and when the learning hold signal LH is High, the selector 101 selects the output of the amplifier 94, and when the learning hold signal LH is Low, the selector 101 selects a value "0". That is, the adaptive equalization is executed when the learning hold signal is High.

The hold registers HG1 to HG7 (102) receives the hold register enable signal HRE (see FIG. 12F) from the controller 8, and when the hold register enable signal HRE is High (i.e., when reading the header field data), the registers REG1 to REG 7 (96) store the resultant output $\mu$Xi(t)e(t)+Ci(t) of the adder 95 as a newly renewed value of each filter coefficient, and when the hold register enable signal HRE is Low (i.e., when reading the recording field data), the hold registers HG1 to HG7 (102) hold the last stored header field contents of the registers 96. Then, when the register preset signal R-PRESET (see FIG. 12G) is High (represented by g1 and g2 at the start of the header field), each of the multiplexers 103 is activated to take out the contents held in the hold registers 102 and preset the same contents to the registers 96, respectively.

By this arrangement, even in the case where intermittent reproduction signals having different kinds of formats comprised of a header field and a data recording field is processed in playback of, such as, a DVD-RAM, the filter coefficients obtained for, e.g., the header field, are stored in the register 96 and subsequently held in the hold registers 102, and when the next header field is reproduced, the contents held in the hold registers 102 are preset to the registers 96. Thus, subsequently to the adaptive equalization of the recording field, the adaptive equalization of the header field can be continuously executed.

Figure 11:
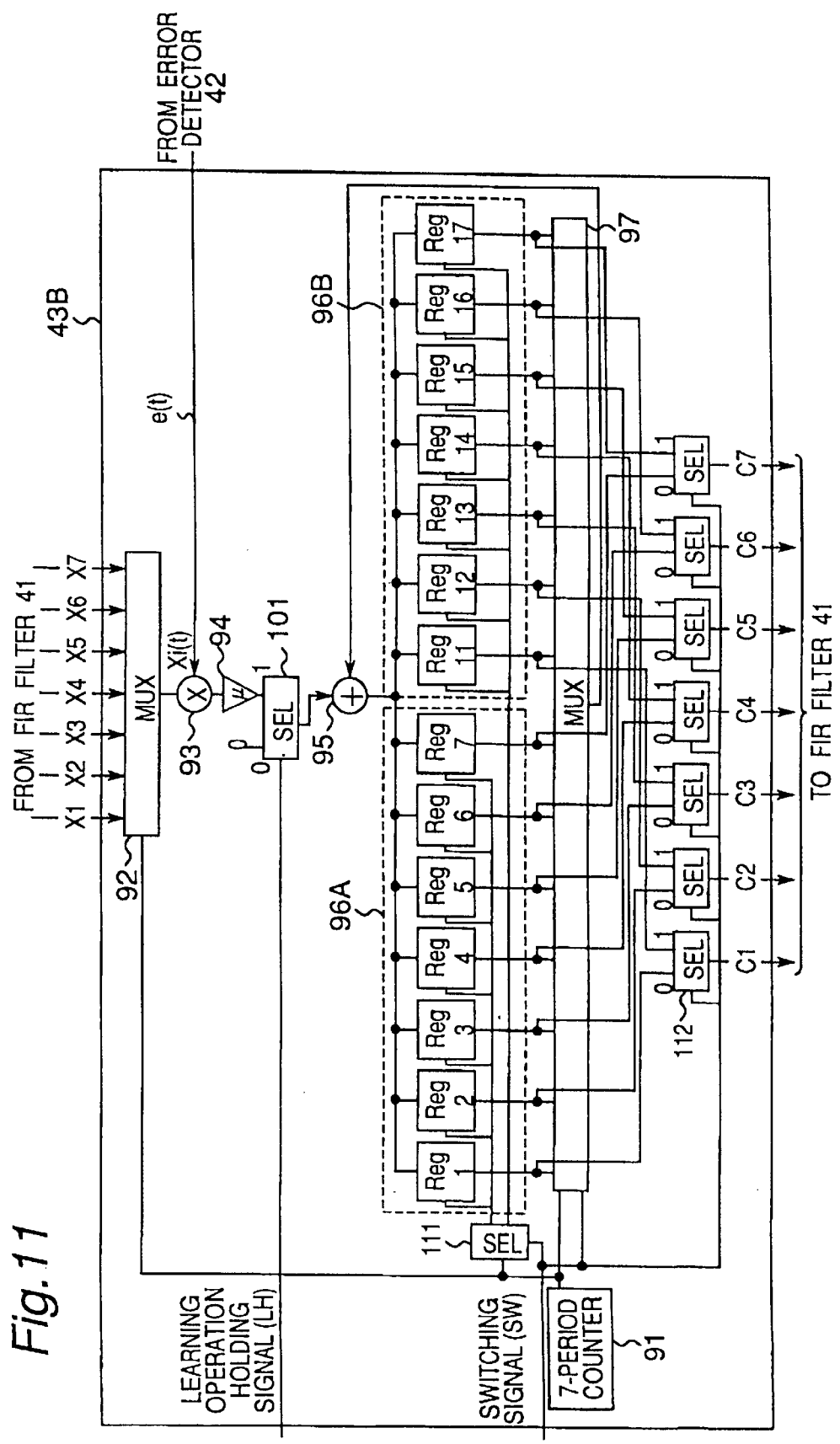
FIG. 11 is a block diagram showing a construction of a LMS coefficient calculation unit according to a second embodiment of the present invention.
Figure 13:
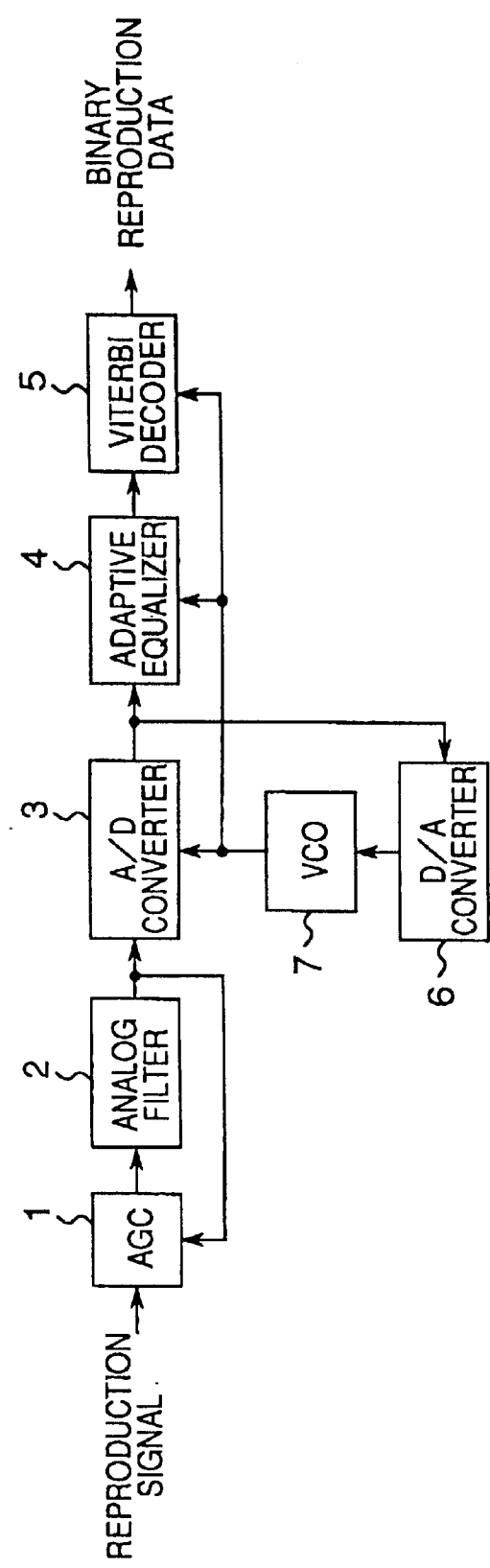
FIG. 13 is a block diagram of a conventional read channel.

FIG. 11 shows a construction 43B of a LMS coefficient calculation block of an adaptive equalizer according to a second preferred embodiment of the present invention. In this construction 43B, the specific feature distinct from the construction 43A shown in FIG. 10 resides in the fact that two groups 96A and 96B of the registers Reg 01 to 07 and Reg 11 to 17 are provided for storing the filter coefficients for adaptive equalization of the two different kinds of transmission signals A and B in quality multiplexed in time basis and that the two groups the registers 96A and 96B are selected by a selector 111 and a selectors group 112 for equalization of each signal by applying the switching signal SW (see FIG. 12H) instead of applying the hold register enable signal and register preset signal.

When the transmission signal A is inputted to the adaptive equalizer, the group 96A of the registers Reg01–Reg07 is selected by the selector 111 in accordance with the switching signal SW sent from the control portion 23, and the renewed filter coefficients are stored in the group 96A registers Reg01–Reg07. Then, the renewed contents stored in the group 96A of the registers Reg01–Reg07 are selected by the selectors group 112 in accordance with the switching signal SW and the selected coefficients C(i) are fed back to the FIR filter block 41.

On the other hand, when the transmission signal B is inputted to the adaptive equalizer, the group 96B of the registers Reg11–Reg17 is selected by the selector 111 in accordance with the switching signal SW, and the renewed filter coefficients are stored in the group 96B registers Reg11–Reg17. Then, the renewed contents stored in the group 96B of the registers Reg11–Reg17 are selected by the selectors group 112 in accordance with the switching signal SW and the selected coefficients C(i) are fed back to the FIR filter block 41.

Thus, even in the case where two different kinds of transmission signals are adaptively equalized, the continuous equalization can be performed by providing two groups of the registers for storing the filter coefficients of each of the signals.

It is to be noted here that, when n kinds of transmission signals having different quality in signal format are processed in playback operation, the continuous equalization can be similarly performed by providing n groups of the registers 96 for storing the filter coefficients of each kind of the signals.

The following describes the control operation of the digital information reproducing apparatus according to the present invention shown in FIG. 1 with reference to the timing charts of the control signals in accordance with the signal format of the reproduction signal shown in FIGS. 12A to 12H. In this embodiment, the description is made in the case where the control portion 23 generating the control signals shown in FIG. 3 is located in the controller 8.

FIGS. 12A through 12H show timing charts in connection with the sector format of the recording guide groove formed on, e.g., a DVD-RAM as a disk medium, where FIG. 12A shows the RF signal output of the preamplifier 10, FIG. 12B shows the output of the preamplifier 10, and FIGS. 12C and 12D show the disk sector format, each sector is comprised of a header field and an information recording field having, for example, a periodically wobbling recording guide groove. The header field is formed of emboss prepits, which is mainly comprised of VFO portions each having a single frequency pattern and address ID portions each having address information recorded. The information recording field is a data rewritable region, and in the case where information is recorded therein, the construction thereof is mainly comprised of guard regions, VFO portions and a user data region for recording user data of, e.g., 2048 bytes.

In this case, when the data reproducing apparatus is initially operated, the reproduction RF signal shown in FIG. 12A includes remarkably different amplitude portions between the header field and the data recording field. Accordingly, the reproduction of the header field and the data recording field is surely identified to thereby produce the identification signal identifying between the different quality of the transmission signals. Once the identification signal is initially generated, in the subsequent reproduction operation, the identification of the header field and the data recording field can be carried out according to the sector format of the signal recorded on the disk medium. Thus, the accurate identification signal can be applied to the control portion 23 shown in FIGS. 2 and 3.

In the case where a DVD-RAM having an emboss region for address information and a data region for user data is used as a disk medium, the respective regions have different reflectance to the application of light beams. When the total sum of the detected signals read out of the disk medium is used as the reproduction signal, the preamplifier 10 amplifies the output signal of the pick-up head and generates the RF signal as shown in FIG. 12A. Then, the low frequency components included in the reproduction signal are removed to obtain the resultant signal as shown in FIG. 12B.

The auto-gain controller (AGC) 1 adjusts the amplitude of the reproduction signal to have a constant amplitude, and the analog filter 2 removes the noise components of high frequency band and emphasizes the necessary frequency band components of the reproduction signal. Then, the A/D converter 3 samples the reproduction signal with a channel clock signal to constitute digital read channels. The sampling clock of the A/D converter is controlled in accordance with the variable frequency oscillation (VFO) regions formed in the sector format (see FIG. 12D).

The digital adaptive equalizer 4 adaptively equalizes the discrete sampled data output of the A/D converter 3 to execute a predetermined PR equalization, and the Viterbi decoder 5 generates the maximum likelihood binary data from the equalization results of the discrete sampled data. The controller 8 generates the various control signals to be applied to the adaptive equalizer 4 for signal equalization processing based on the binary outputs data of the Viterbi decoder 5.

For example, in the disk medium such as DVD-RAM, a sector format is comprised of a header field including an emboss pits string region for recording address information and a data recording field for recording user data where the signal quality is different between the header field and the data recording field as described above. In this case, the controller sends the various control signals to the adaptive equalizer 4 as shown in FIG. 3 to adaptively equalize the transmission signals of the header field and the data recording field, individually. In this embodiment, only the filter coefficients of the header field are held in the holding portion 22 to realize the continuous equalization, improving the reliability of the binary output of the reproduction data. Alternatively, the filter coefficients of both the header field and the data recording field may be held in the holding portion 22 in a modified embodiment.

In the embodiment 1 having the LMS coefficient calculation block construction 43A shown in FIG. 10, the controller 8 sends the control signals of the learning hold signal LH shown in FIG. 12E, hold register enable signal HRE shown in FIG. 12F and register preset signal R-PRESET shown in FIG. 12G, whereby the learned results of the filter coefficients of the header field are held in the hold registers 102 during the process of the data recording field and the held coefficients are preset to the registers 96 in the subsequent process of the next header field, and thus the continuous adaptive equalization is realized.

In the embodiment 2 having the LMS coefficient calculation block construction 43B shown in FIG. 11, the controller 8 sends the control signals of the learning hold signal LH shown in FIG. 12E and switching signal SW shown in FIG. 12H to realize the continuous adaptive equalization over the header field and the data recording field. These control signals are generated under control of the levels thereof High or Low in accordance with the sector format of the transmission signal data length counted by the counter 32 provided in the control portion 23 shown in FIG. 3.

In a DVD-RAM used as the disk medium, there may be a case where the land track and the groove track have different reproduction signal qualities or a case where the sector format has a plurality of data recording layers each having different reproduction signal qualities. In these cases, by applying the control signals to the adaptive equalizer of the present invention, the continuous adaptive equalization can be realized over the land track and the groove track or jumping over the plurality of recording layers, improving the reliability of the binary output of the reproduction data.

As described above, according to the adaptive equalizer of the present invention, even in the case where the transmission signals multiplexed in time basis having different signal quality are equalized, the LMS coefficient calculation block calculates the optimal filter coefficients to be stored and held for each of the different signals, the continuous adaptive equalization can be realized over the different kinds of signals in quality.

In the digital information reproducing apparatus according to the present invention, various control signals are fed from the controller to the adaptive equalizer, and the continuous adaptive equalization can be realized over the header field and the data recording field.

Similarly, according to the present invention, the continuous adaptive equalization can be realized over the land track and the groove track or jumping over the plurality of recording layers having different reproduction signal qualities, improving the reliability of the binary output of the reproduction data.

In the present embodiment, although the description is made with respect to the reproduction of the optical disk having a sector format having a recording guide groove periodically wobbling, the present invention can be also applicable to the reproduction of CD disk, DVD-ROM disk and the like.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An adaptive equalizer for adaptively equalizing discrete sampled data of a first signal and a second signal reproduced from an optical disk, the first and second signals having different signal qualities multiplexed in time basis, wherein the optical disk has a periodically wobbling sector format which includes a first region on which the first signal is recorded and a second region on which the second signal is recorded, said adaptive equalizer comprising:

a learning portion operable to adaptively equalize each of the multiplexed first and second signals according to a respective signal format of the first and second signals, said learning portion comprising a FIR filter portion operable to equalize the sampled data of each of the first and second signals, and a coefficient calculating portion operable to recursively renew coefficients of said FIR filter portion based on output data of said FIR filter portion, wherein said coefficient calculating portion includes a holding portion operable to temporarily hold the renewed coefficients as learned results of at least one of the first and second signals learned by said learning portion, and wherein said learning portion is operable to perform adaptive equalization using last learned results temporarily held in said holding portion, and an equalization operation duration of said learning portion is determined in accordance with a formatted data length of each of the first and second signals.

2. The adaptive equalizer as claimed in claim 1, wherein the first region of the optical disk is an ID recording header region comprising an emboss pits region and the second region of the optical disk comprises a data recording region, and wherein said holding portion holds the learned results of the sampled data of the first signal which is reproduced from the emboss pits region.

3. The adaptive equalizer as claimed in claim 1, wherein the first region of the optical disk is an ID recording header region comprising an emboss pits region and the second region of the optical disk comprises a data recording region, and wherein said holding portion holds the learned results of the sampled data of the first and second signals which are reproduced from the emboss pits region and the data recording region, respectively.

4. The adaptive equalizer as claimed in claim 1, wherein said coefficient calculating portion further includes a coefficient register portion comprising a first coefficient register portion operable to register the renewed coefficients of the first signal and a second coefficient register portion operable to register the renewed coefficients of the second signal, and wherein the coefficients of said FIR filter portion are renewed selectively using output data of said first and second coefficient register portions.

5. The adaptive equalizer as claimed in claim 1, wherein said coefficient calculating portion further includes a selector operable to select between delayed values output from said FIR filter portion, the delayed values selected by said selector being held by said holding portion as the renewed coefficients.

6. The adaptive equalizer as claimed in claim 1, wherein said holding portion comprises n registers and said coefficient calculating portion further includes:

a first multiplexer operable to select one of n values output from said FIR filter portion based on an output of an n-period counter, where n is a positive integer;

a multiplier operable to multiply the selected value outputted from said first multiplexer by an equalization error to obtain a product;

an amplifier operable to amplify the product output from said multiplier;

an adder operable to add the amplified product to each of pre-renewed coefficients of said FIR filter portion, wherein said n registers are operable to store an output of said adder as the renewed coefficients based on the output of the n-period counter; and a second multiplexer operable to select one of said n registers based on the output of the n-period counter.

* * * * *